(12) United States Patent
Lu

(10) Patent No.: US 12,710,599 B2
(45) Date of Patent: Aug. 18, 2026

(54) MULTI-FIBER CONNECTION SYSTEM

(71) Applicant: CommScope Technologies LLC, Hickory, NC (US)

(72) Inventor: Yu Lu, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 339 days.

(21) Appl. No.: 18/363,916

(22) Filed: Aug. 2, 2023

(65) Prior Publication Data

US 2024/0045151 A1 Feb. 8, 2024

Related U.S. Application Data

(60) Provisional application No. 63/394,748, filed on Aug. 3, 2022.

(51) Int. Cl.
*G02B 6/38* (2006.01)

(52) U.S. Cl.
CPC ......... *G02B 6/3821* (2013.01); *G02B 6/3825* (2013.01); *G02B 6/3883* (2013.01); *G02B 6/3893* (2013.01)

(58) Field of Classification Search
CPC ... G02B 6/3821; G02B 6/3883; G02B 6/3893
See application file for complete search history.

(56) References Cited

U.S. PATENT DOCUMENTS 4,793,683 A * 12/1988 Cannon, Jr. .......... G02B 6/3825 385/75
7,758,257 B2 7/2010 Anderson et al.
9,810,851 B2 11/2017 Lu
2021/0041640 A1* 2/2021 Singer .................. G02B 6/3604

* cited by examiner

*Primary Examiner* — Sung H Pak
(74) *Attorney, Agent, or Firm* — Merchant & Gould P.C.

(57) ABSTRACT

A multi-fiber optical connector system including a first and a second multi-fiber connector configured to mate with one another. The multi-fiber connectors include a connector body having a front end and a rear end, a multi-fiber ferrule having a face accessible at the front end of the connector body and a spring for biasing the multi-fiber ferrule in a forward direction relative to the connector body. The spring is configured so that the first and second ferrule rotate with one another or do not rotate when the ferrule is biased forward.

6 Claims, 11 Drawing Sheets

MULTI-FIBER CONNECTION SYSTEM

CROSS-REFERENCE TO RELATED APPLICATION

This application claims the benefit of provisional application Ser. No. 63/394,748, filed Aug. 3, 2022, which is incorporated herein by reference in its entirety.

TECHNICAL FIELD

The present disclosure relates generally to a multi-fiber connection system for reducing losses.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems.

Fiber optic connectors are commonly used in optical fiber communication systems to effect demateable optical connections between waveguides such as optical fibers. A typical optical connection is made by co-axially aligning two waveguides (e.g., optical fibers) in end-to-end relation with end faces of the waveguides opposing one another. To effect optical coupling and minimize Fresnel loss, it is typically preferred for “physical contact” to exist between the optical waveguides, which, in the case of optical connectors, is generally between the opposed end faces of the aligned optical fibers.

Traditionally optical connectors have employed “ferrules.” Ferrules are well-known components which each hold one or more optical fibers such that the end faces of the fibers are presented for optical coupling. The ferrules of fiber optic connectors are often spring biased such that, when one connector is mated to another connector, opposing faces of the ferrules are urged together. The ferrules of ferruled connectors assist in the fiber alignment process and the fiber or fibers supported by a given ferrule are precisely positioned relative to the ferrule. A traditional multi-fiber optical connector such as an MPO connector can include a ferrule that supports a plurality of optical fibers in a row. In MPO connectors, the ferrules of two fiber optic connectors desired to be coupled together have a mating male and female configuration (e.g., a pin and socket configuration) which aligns the ferrules and concurrently aligns the fibers supported by the ferrules. In some cases, there are misalignment losses between the ferrules. Improvements are desired.

SUMMARY

The present disclosure relates to a multi-fiber optic connection system. In one aspect, the present disclosure relates to a multi-fiber optical connector system including a first connector and a second connector that are adapted to mate with one another. The first and second connectors each include a connector body that has a front end and a rear end, a multi-fiber ferrule that has a face accessible at the front end of the connector body, and a spring for biasing the multi-fiber ferrule in a forward direction relative to the connector body. The spring of the first connector is wound in a first direction and the spring of the second connector is wound in a second direction that is opposite to the first direction.

In some examples, each of the multi-fiber ferrules includes exposed optical fibers. In some examples, the optical fibers of the first and second connectors are aligned with one another when the first and the second connectors are mated.

In some examples, the first connector includes an alignment pin and is a male connector, and the second connector includes alignment pin openings and is a female connector, wherein when the first connector and the second connectors are mated with one another, the alignment pins of the male connector fit within the pin openings of the female connector.

In some examples, each of the connectors includes at least 12 optical fibers.

In another aspect, the present disclosure relates to a multi-fiber optical connector system that includes a first connector and a second connector that are adapted to mate with one another. The first and second connectors each include a connector body having a front end and a rear end, a multi-fiber ferrule having a face accessible at the front end of the connector body, and a spring for biasing the multi-fiber ferrule in a forward direction relative to the connector body, and a washer disposed between the spring and the multi-fiber ferrule, wherein the washer reduces rotation caused by the spring.

In some examples, the washer is made of Teflon.

In another aspect, the present disclosure relates multi-fiber optical connector system including a first connector and a second connector adapted to mate with one another. The first and second connectors each include a connector body having a front end and a rear end, a multi-fiber ferrule having a face accessible at the front end of the connector body and a spring for biasing the multi-fiber ferrule in a forward direction relative to the connector body, the spring is a zero rotation spring.

In some examples, the zero rotation spring is a wave spring.

In some examples, the zero rotation spring is a dual wind spring.

BRIEF DESCRIPTION OF THE DRAWINGS

The present disclosure relates generally to fiber optic connection components such as fiber optic connectors and adapters. More particularly, the present disclosure relates to ferrule-less fiber optic connection components, systems, and methods.

FIG. 6 is a schematic view of a multi-fiber optical connector system in accordance with the principles of the present disclosure with a first and second multi-fiber optic connector;

DETAILED DESCRIPTION

The present disclosure generally relates to a multi-fiber optic system for a first and a second multi-fiber connectors that are adapted to mate with one another. Specifically, the present disclosure relates to minimizing misalignment losses between optical fibers of the first and second multi-fiber connectors. In some cases, the multi-fiber connectors include springs which bias multi-fiber ferrules in the connectors towards one another when mated together, as discussed in the background. Springs used in each of the respective connectors typically have the same direction wind (e.g., left, or right hand winds). The same direction winds can cause opposite direction torques on each of the ferrules. When the connectors are mated, the springs are mirrored with one another such that the winds are opposite with one another which can cause the opposite torques. The opposite torques are increased when there is a force against the spring (e.g., when the ferrules are urged together when multifiber connectors are mated with one another). The opposite torques can cause misalignments between the fiber optic connectors leading to losses related to misalignment.

Figure 1:
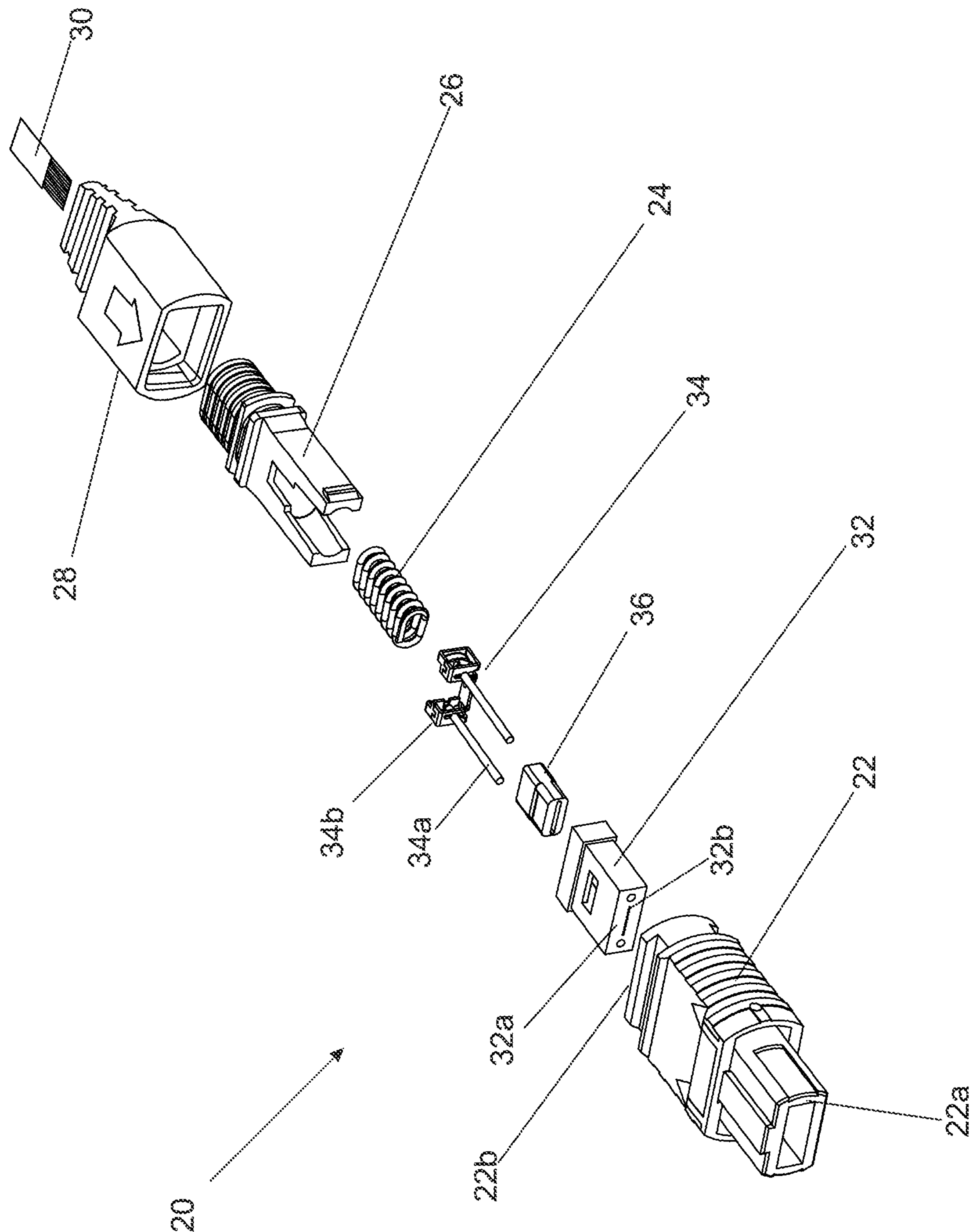
FIG. 1 is an exploded view of a fiber optic connector in accordance with the principles of the present disclosure.

FIG. 1 depicts an exploded view of a fiber optic connector 20 in accordance with the principles of the present disclosure. The fiber optic connector 20 includes a connector body 22, a spring 24, a spring push 26, a boot 28, an optical fiber ribbon 30, and a ferrule 32. The connector body 22 includes a front end 22*a* and a rear end 22*b*. The ferrule 32 fits within the connector body 22 and includes a face 32*a*. The face 32*a* of the ferrule 32 is oriented towards the front end 22*a* of the connector body 22. The face 32*a* additionally includes a row of openings 32*b* configured to receive optical fibers. The spring 24 is configured to bias the ferrule 32 in a forward direction relative to the connector body 22.

Figure 2:
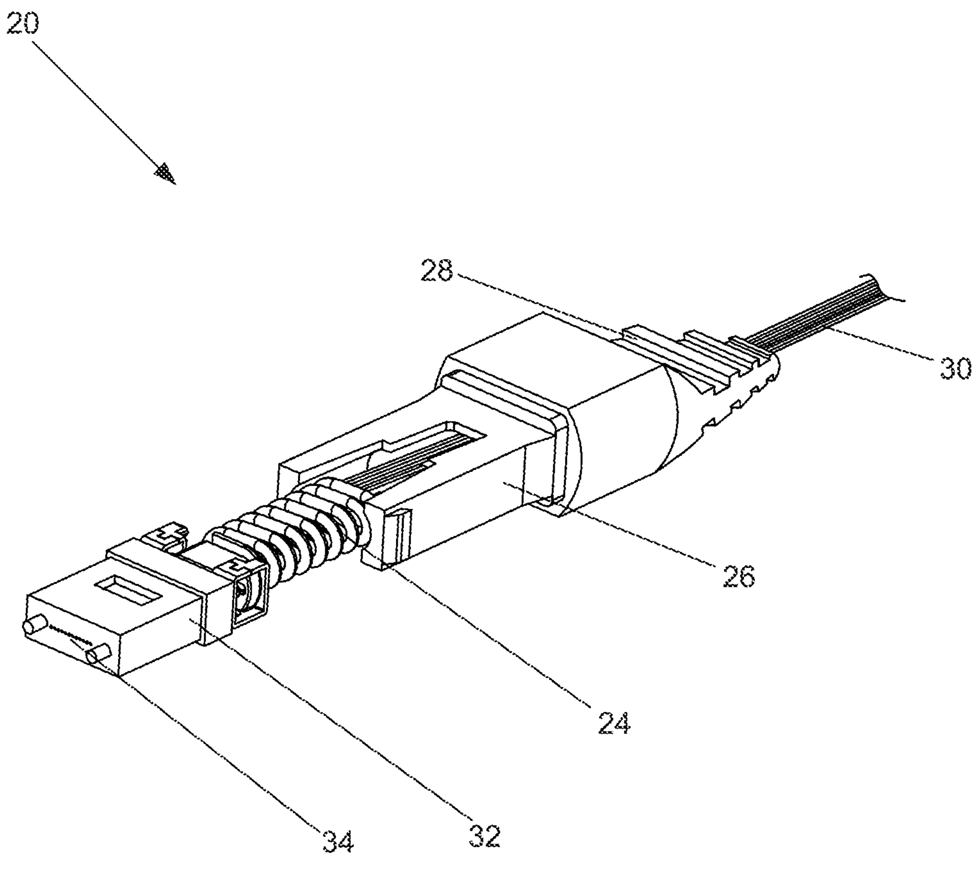
FIG. 2 is the fiber optic connector of FIG. 1 with a connector body removed.

FIG. 2 depicts the fiber optic connector 20 of FIG. 1 assembled with the connector body 22 removed. The ferrule 32 is depicted supporting a plurality of optical fibers 50 from the optical fiber ribbon 30. The ferrule 32 further includes a ferrule boot 36 which is adapted to receiving and guiding fibers into the ferrule 32. The spring 24 abuts the ferrule 32 at the boot 28 side to bias the ferrule 32 forwardly relative to the connector body 22. The optical fiber ribbon 30 extends through the connector body 22. At a front end 22*a* of the optical fiber ribbon 30, of the optical fiber ribbon 30, a matrix material has been removed so that the end portions of the optical fibers within the openings 32*b* are bare glass (i.e., each fiber includes only a core surrounded by cladding). In the depicted example, the fiber optic connector 20 includes 12 optical fibers. It will be appreciated that more or less optical fibers can be used.

As discussed above, the fiber optic connector 20 is configured to mate with a similar fiber optic connector 20. To mate, the fiber optic connector 20 includes an alignment pin assembly 34. The alignment pin assembly 34 includes alignment pins 34*a* which include base ends that are supported within a pin base 34*b*. The alignment pins 34*a* are configured to fit within pin openings. Thus, the depicted ferrule 32 corresponds to a male multifiber connector. A female fiber optic connector includes similar components to the male fiber optic connector except the female fiber optic connector includes pin openings to receive the alignment pins 34*a* of the male fiber optic connector. As discussed above, the spring 24 biases the ferrule 32 forwardly relative to the connector body 22. The ferrule 32 is biased forwardly so that when the fiber optic connector 20 is mated with a second fiber optic connector the respective ferrules are biased towards providing direct contact between optical fibers of one another to minimize losses.

Figure 3:
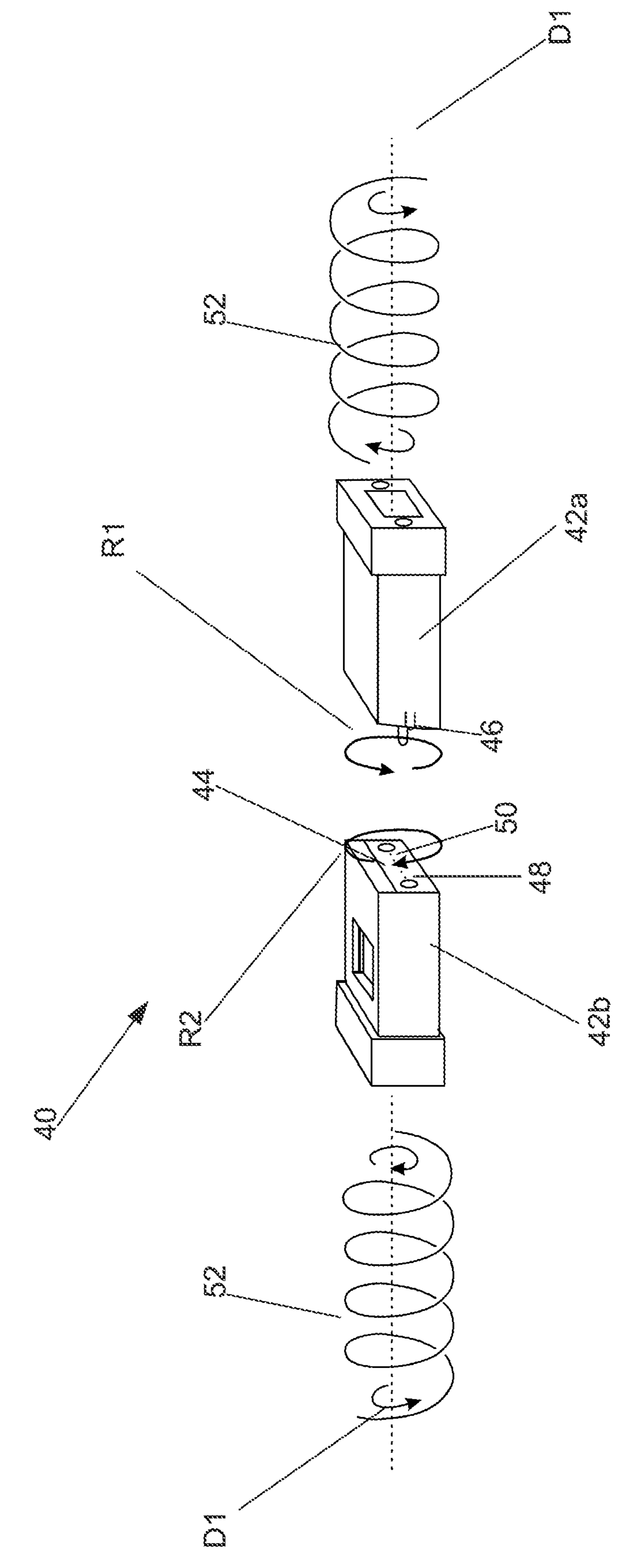
FIG. 3 is a schematic view of a prior art multi-fiber optical connector system including a first and a second fiber optic connector.
Figure 4:
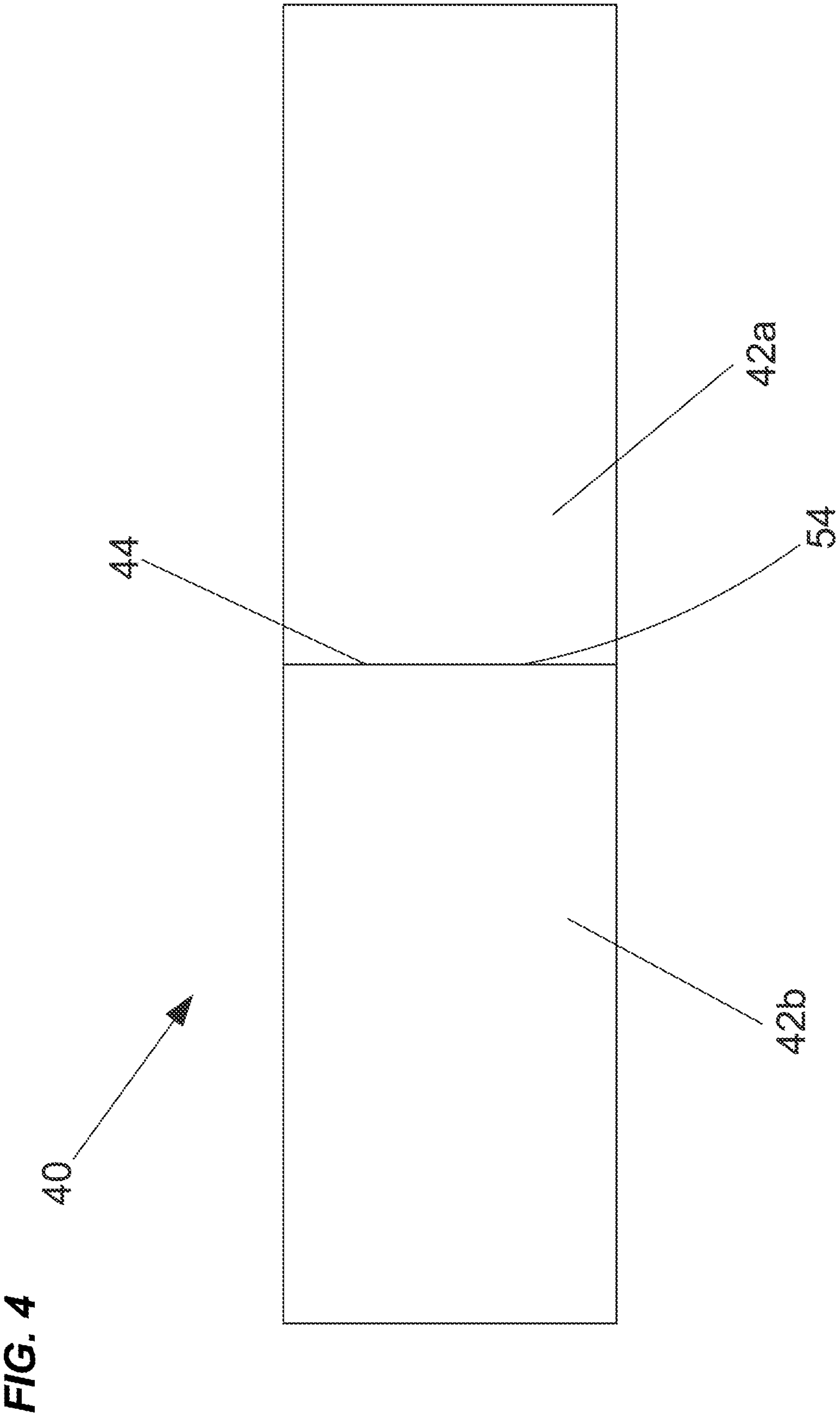
FIG. 4 is a schematic view of the prior art multi-fiber optical connector system with the first and second a first and second multi-fiber optic connector mated with one another at an interface.
Figure 5:
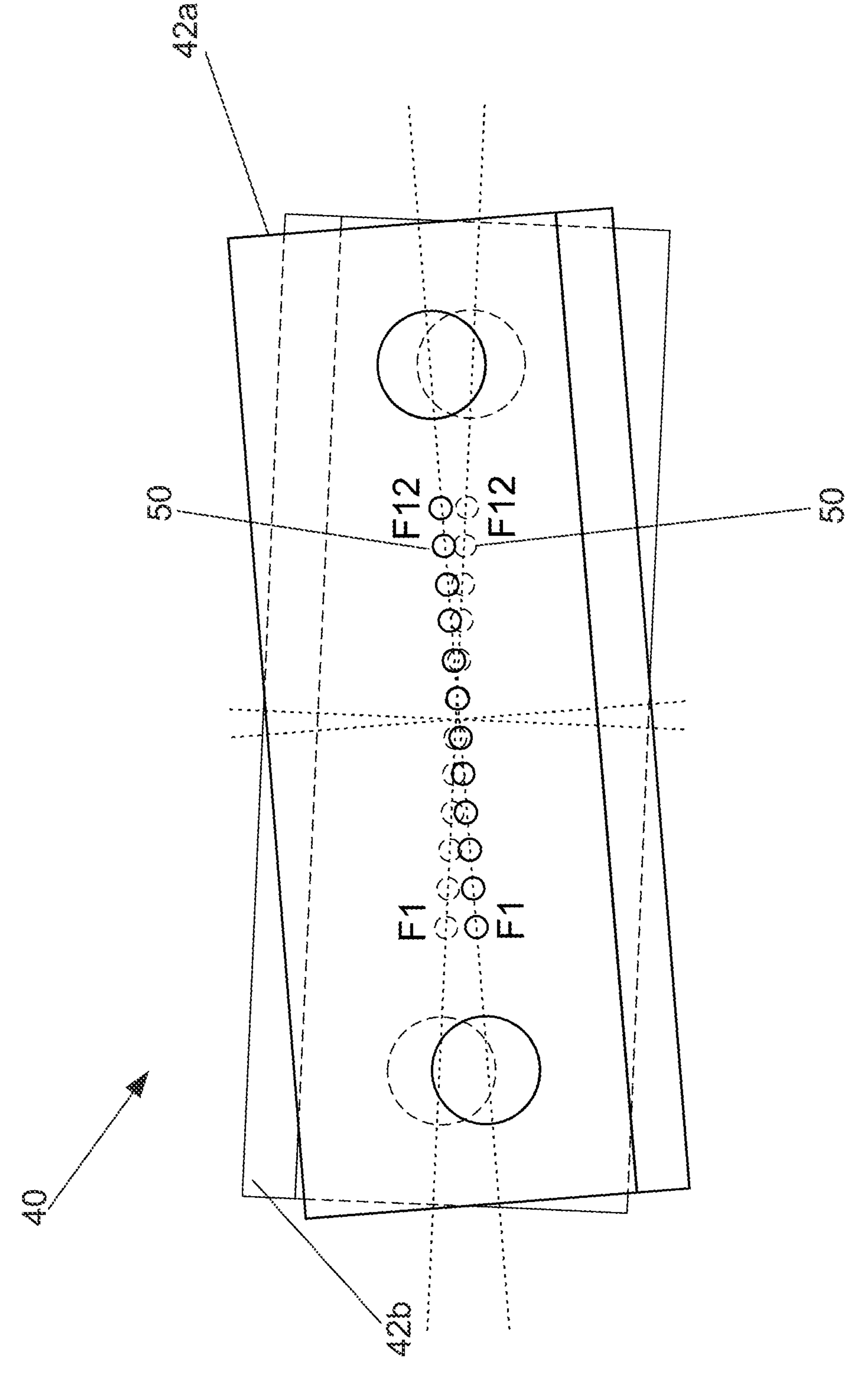
FIG. 5 is a sectional view of the prior art multi-fiber optical connector system of FIG. 4 at the interface.

FIG. 3 depicts a schematic diagram of a prior art fiber connection system 40. As depicted, the fiber optic connection system 40 includes a male ferrule 42*a* and a female ferrule 42*b*. The males and female ferrules 42*a*, 42*b* each include a face 44. The face of the male ferrule includes a fiber alignment pin 46 and the face 44 of the female ferrule 42*b* includes a fiber alignment opening 48. The male and female ferrules 42*a*, 42*b* are aligned with one another so that their respective faces face one another and so that the alignment pin 46 will fit within the alignment opening 48. The male and female ferrules 42*a*, 42*b* each include a row of optical fibers 50. The male and female ferrules 42*a*, 42*b* each include a spring 52 to bias the male and female ferrules 42*a*, 42*b* towards one another. The springs 52 of each of the male and female ferrules are wound in a direction D1. The springs being wound in the same direction D1 causes the male connector 42*a* to rotate in a first rotation direction R1 and the female ferrule to rotate in a second rotation direction R2 which is opposite to the first rotation direction R1. As can be seen in FIG. 4, the faces 44 of the male and female ferrules 42*a*, 42*b* meet at an interface 54 wherein the alignment pin 46 of the male connector 42*a* is mated within the alignment opening 48 of the female connector 42*b*. FIG. 5 shows a sectional view of the connection system 40 along the interface 54. As can be seen in the figure, the fibers 50 of the male and female ferrules 42*a*, 42*b* are misaligned due to the opposite rotation direction. The misalignment can cause issues and lead to losses.

Figure 6:
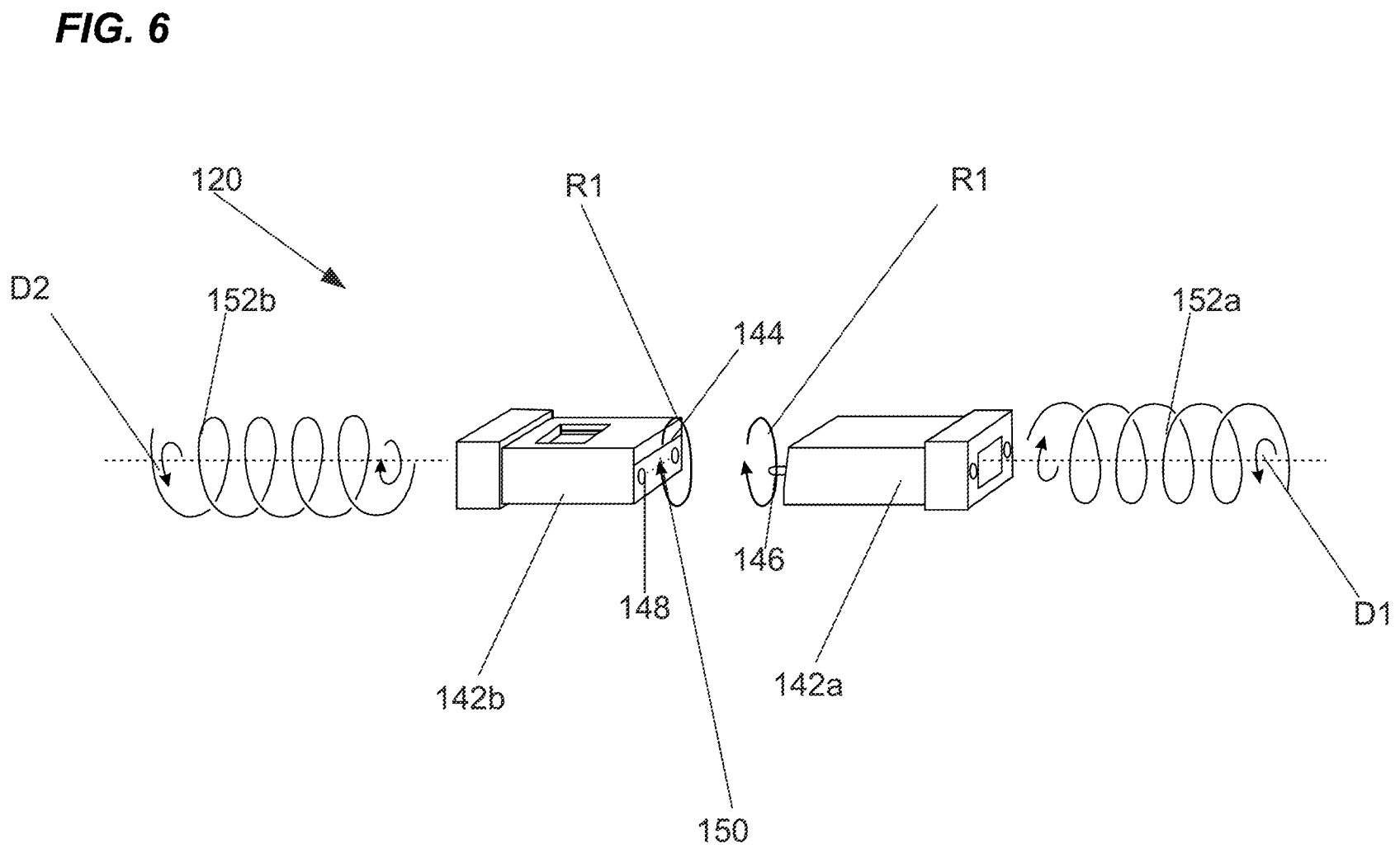

FIG. 6 depicts a schematic diagram of a fiber connection system 120 in accordance with the principles of the present disclosure. The fiber optic connection system 120 includes a male ferrule 142*a* and a female ferrule 142*b*. The males and female ferrules 142*a*, 142*b* each include a face 144. The face of the male ferrule 142*a* includes a fiber alignment pin 146 and the face 144 of the female ferrule 142*b* includes a fiber alignment opening 148. The male and female ferrules 142*a*, 142*b* include a row of optical fibers 150. The male ferrule 142*a* includes a spring 152*a* which is wound in a direction D1 and the female ferrule 142*b* includes a spring 152*b* which is wound in a second direction D2 which is opposite to the first direction D1.

Figure 7:
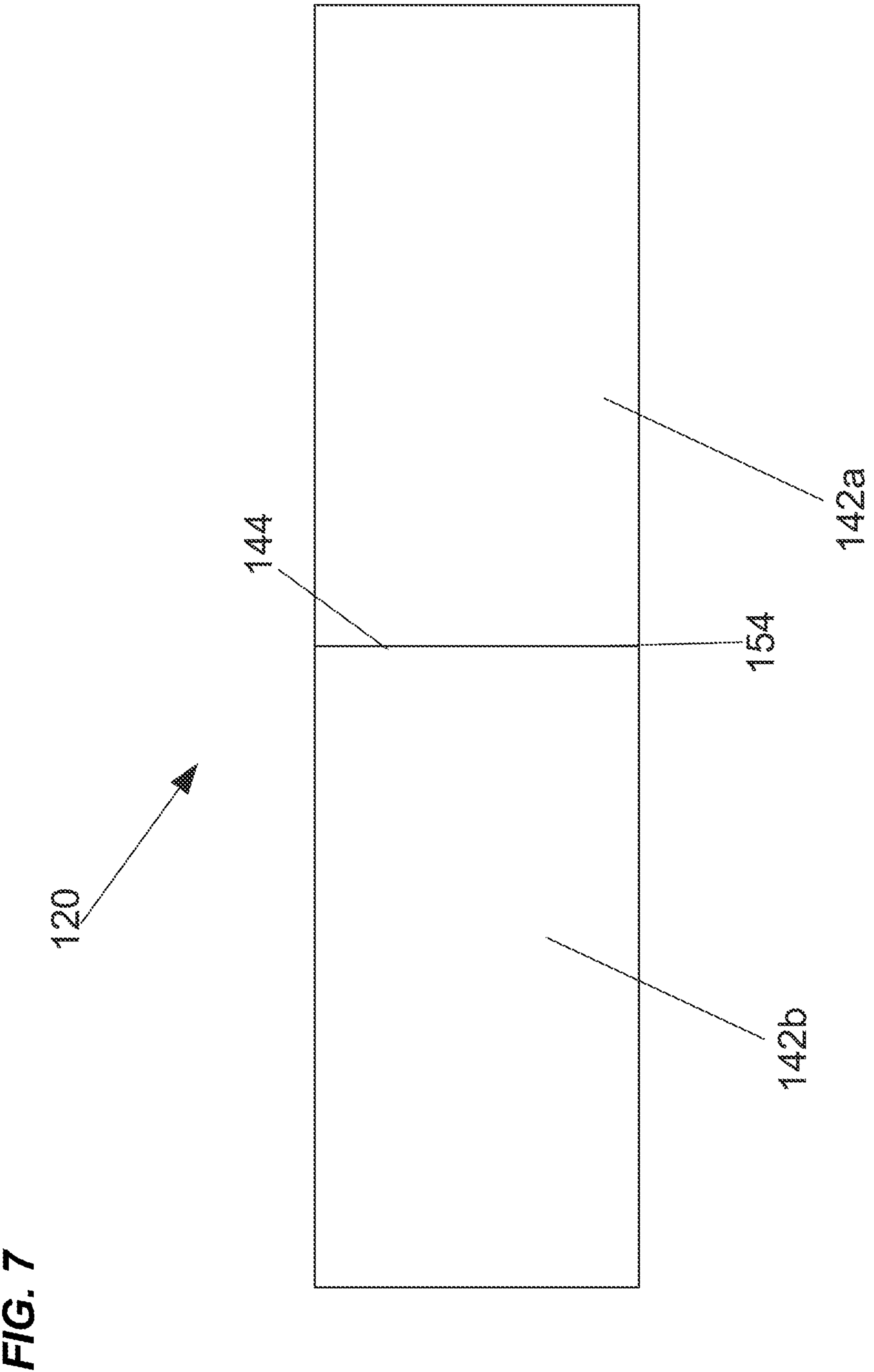
FIG. 7 is a schematic view of the multi-fiber optical connector system with a first and second a first and second multi-fiber optic connector of FIG. 6 mated with one another at an interface.
Figure 8:
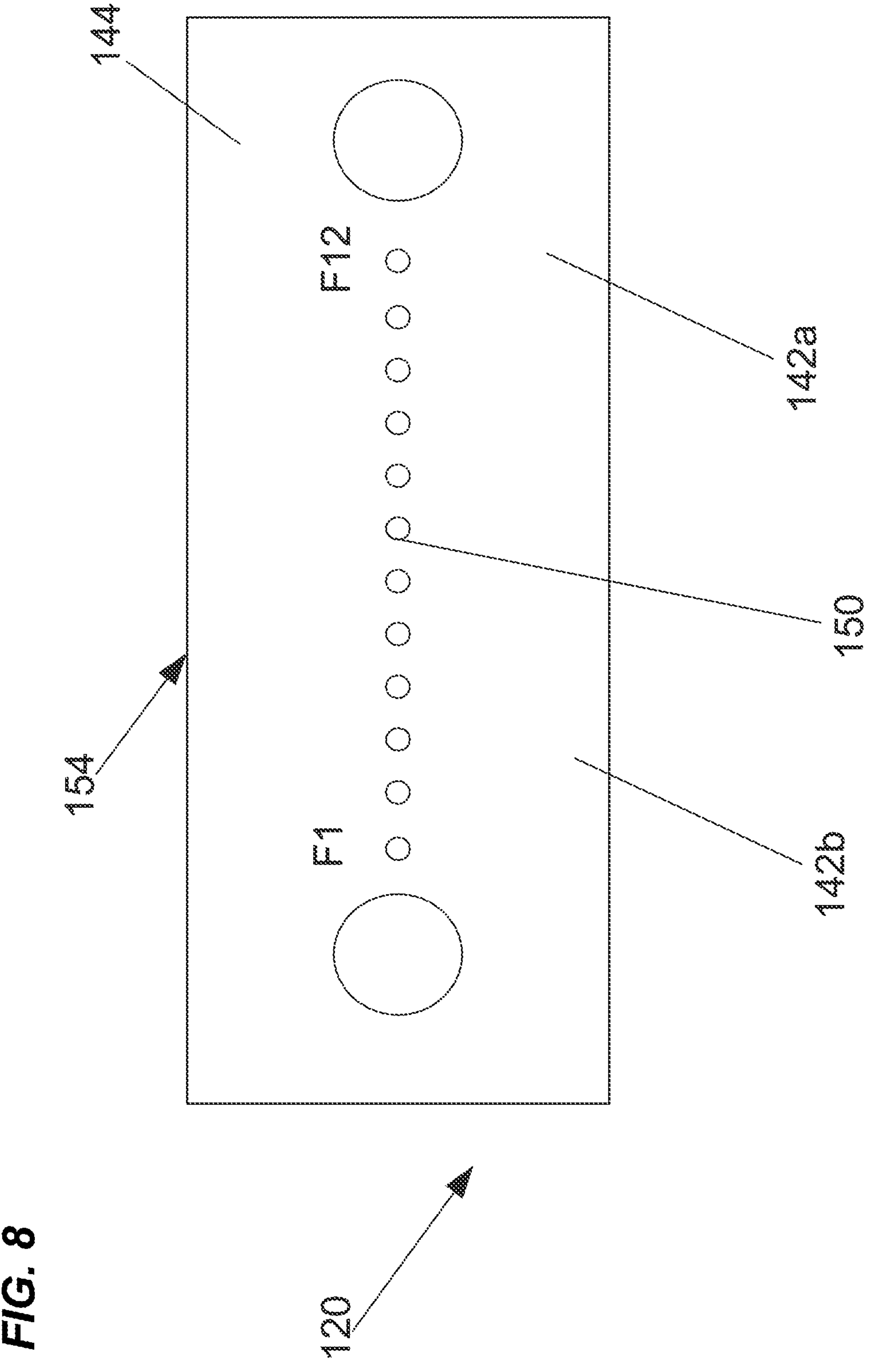
FIG. 8 is a sectional view of the multi-fiber connection system of FIG. 7 at the interface.

Because the springs 152*a*, 152*b* of each of the male and female ferrules 142*a*, 142*b* are wound in opposite directions, the male ferrule and the female ferrule 142*a*, 142*b* both rotate in a similar rotation direction R1 when their respective faces 144 are urged together. FIG. 7 shows the faces 144 of the male and female ferrules 142*a*, 142*b* meeting at an interface 154. FIG. 8 shows a sectional view of the connection system 120 along the interface 154. As can be seen in the figure, the optical fibers 150 of the male and female ferrules 142*a*, 142*b* are aligned due to the ferrules having a similar rotation direction which can reduce losses related to misalignment.

Figure 9:
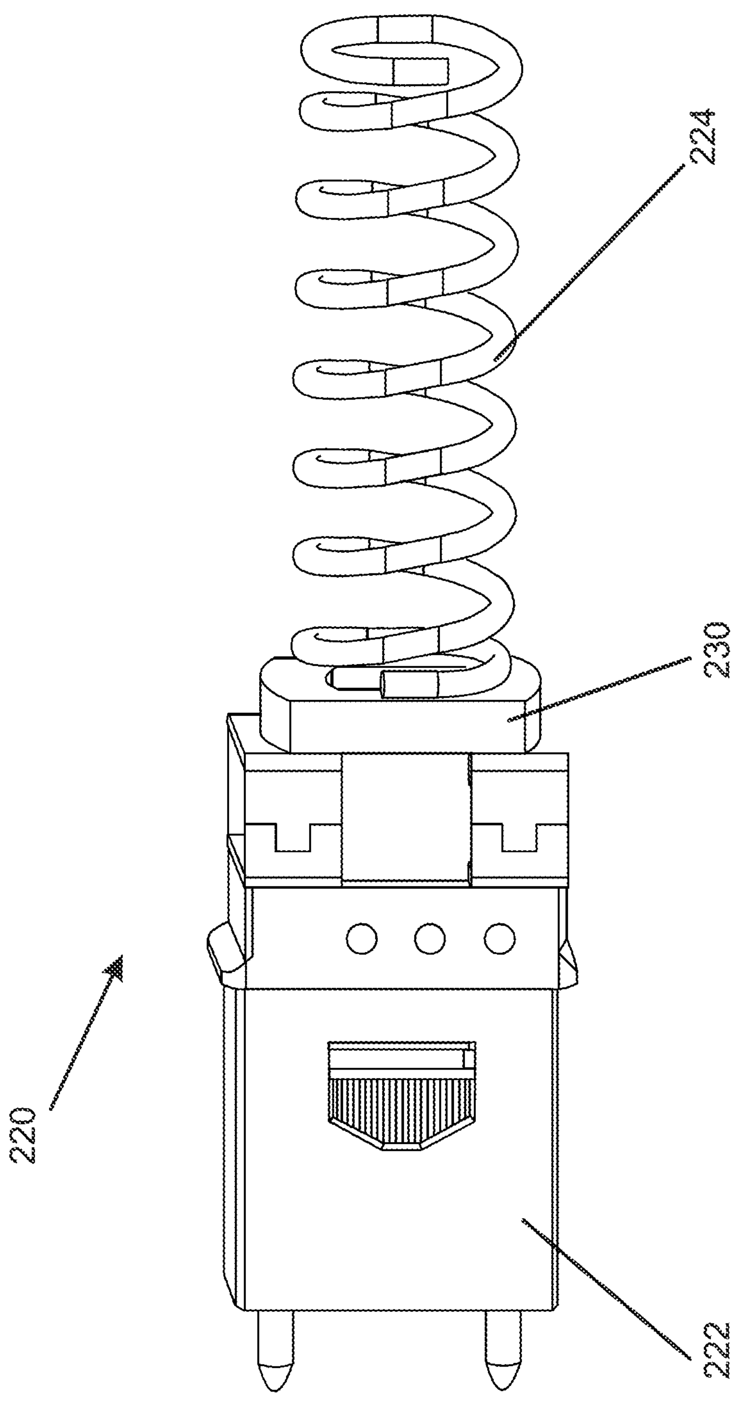
FIG. 9 is a multi-fiber connector in accordance with the principles of the present disclosure.
Figure 10:
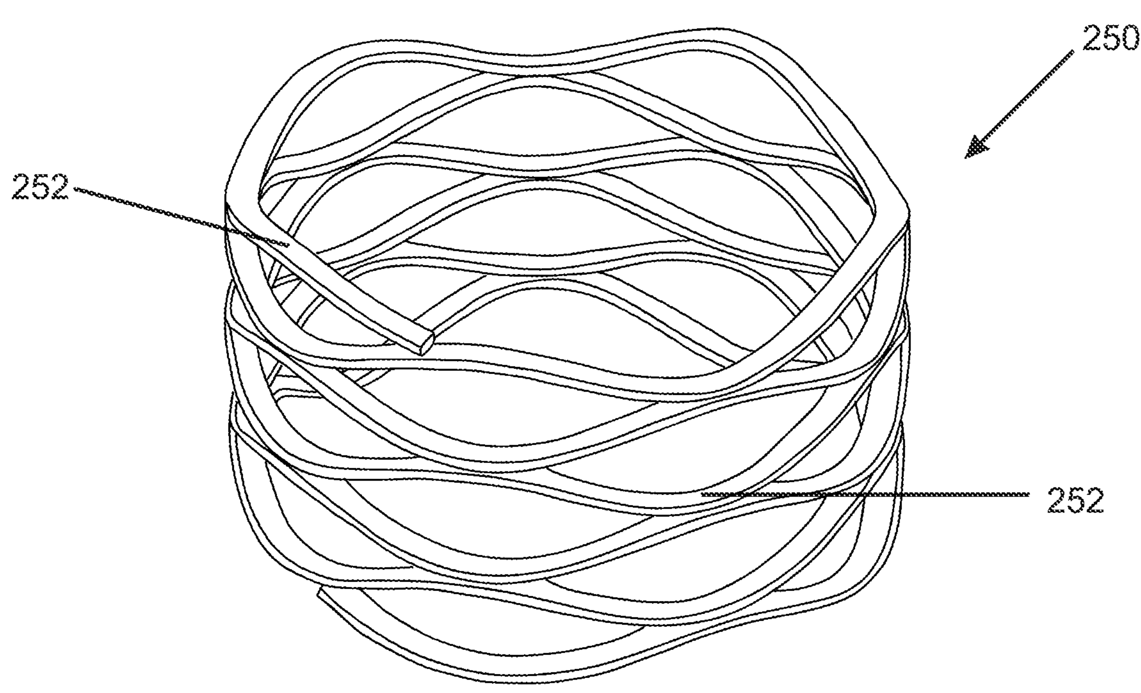
FIG. 10 is a spring in accordance with the principles of the present disclosure suitable for use with the fiber optic connector of FIG. 1.
Figure 11:
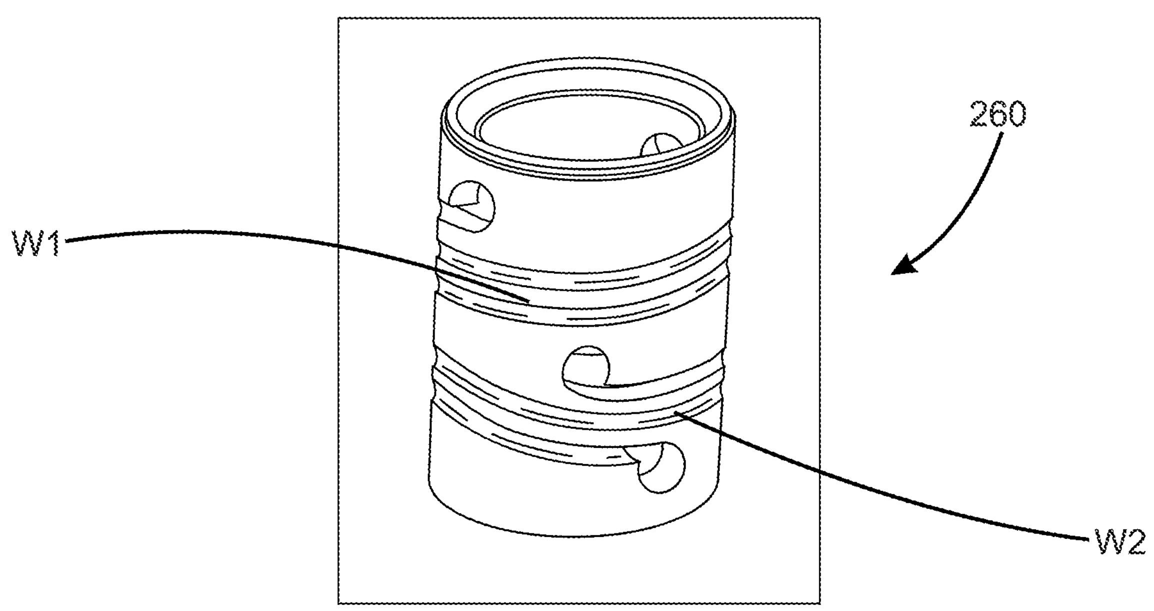
FIG. 11 is a spring in accordance with the principles of the present disclosure suitable for use with the fiber optic connector of FIG. 1.

In some embodiments, to minimize losses related to misalignment in connection systems the impact of spring rotation is be reduced. FIGS. 9-11 depict various examples of how spring rotation can be reduced.

FIG. 9 depicts a fiber optic connector 220 in accordance with the principles of the present disclosure. The fiber optic connector 220 includes a ferrule assembly 222 and a spring 224 similar to the ferrule 32 and the spring 24 depicted in FIGS. 1 and 2. The fiber optic connector 220 is depicted without a connector body. The fiber optic connector 220 includes a washer 230 disposed between the ferrule assembly 222 and the spring 224. The washer 230 can be made from Teflon or a similar material. In some examples, the washer 230 lessens the effects of rotation caused by the spring 224.

In other examples, a connector similar to the fiber optic connector 20 in FIGS. 1 and 2 can include a zero rotation spring which is a spring that does not have a wind or twist. For example, FIG. 10 depicts a wave spring 250 which can be used in place of the spring 24 of FIGS. 1 and 2. The wave spring 250 is made up of wave shaped portions 252 rather than a continuous wind which are used in traditional springs. The wave spring 250 can bias a ferrule in a similar way to the spring 24 shown in FIGS. 1 and 2 that has a continuous wind. Wave springs additionally provide a similar biasing force in a smaller space.

FIG. 11 depicts a different example of a spring in accordance with the principles of this disclosure. The spring shown in FIG. 11 is a dual wind spring 260. The dual wind spring 260 can additionally be used in place of the spring 24 depicted in FIGS. 1 and 2. The dual wind spring 260 includes a first wind W1 in a first direction and a second wind W2 in a second direction that is opposite to the first direction. The first and second winds W1, W2 each cause an opposite rotation and result in a spring that does not cause rotation when used for biasing a ferrule.

In some other embodiments, to reduce the effects of spring rotation, male and female ferrules, similar to the ferrule 32 discussed above and shown in FIGS. 1 and 2, include fiber alignment pins and fiber alignment openings which are closer to optical fibers and have a reduced clearance between the alignment pins and pin openings and the optical fibers. In some other examples, a fiber optic connector, similar to the fiber optic connector 20 discussed in FIGS. 1 and 2, have a space between a ferrule boot and a spring. In this way, there is a space between the ferrule and the spring, in this way the twist of the spring is not coupled to the ferrule.

From the forgoing detailed description, it will be evident that modifications and variations can be made without departing from the spirit and scope of the disclosure.

What is claimed is:

1. A multi-fiber optical connector system comprising:

a first connector and a second connector adapted to mate with one another, the first and second connectors each including:

a connector body having a front end and a rear end;

a multi-fiber ferrule having a face accessible at the front end of the connector body;

a spring for biasing the multi-fiber ferrule in a forward direction relative to the connector body; and a washer disposed between the spring and the multi-fiber ferrule, wherein the washer reduces rotation caused by the spring;

the spring of the first connector is wound in a first direction and the spring of the second connector is wound in a second direction that is opposite to the first direction.

2. The multi-fiber optical connector system of claim 1, wherein each of the multi-fiber ferrules includes exposed optical fibers.

3. The multi-fiber optical connector system of claim 2, wherein the optical fibers of the first and second connectors are aligned with one another when the first and the second connectors are mated.

4. The multi-fiber optical connector system of claim 1, wherein the first connector includes an alignment pin and is a male connector, and the second connector includes alignment pin openings and is a female connector, wherein when the first connector and the second connectors are mated with one another, the alignment pins of the male connector fit within the pin openings of the female connector.

5. The multi-fiber optical connector system of claim 1, wherein each of the connectors includes at least 12 optical fibers.

6. The multi-fiber optical connector system of claim 1, wherein the washer is made of polytetrafluoroethylene.

* * * * *